Patented July 9, 1940

2,207,626

UNITED STATES PATENT OFFICE 2,207,626

THERMOSETTING RESIN REACTION PRODUCT OF FURFURAL WITH A SATURATED OXY-CARBOXYLIC ACID

Irving E. Levine, Richmond, and Donald D. Lee, Berkeley, Calif., assignors to Standard Oil Company of California, San Francisco, Calif., a corporation of Delaware No Drawing. Application June 17, 1938, Serial No. 214,306

10 Claims. (Cl. 260—67)

This invention relates to synthetic resins derived from the reaction of furfural with saturated hydroxy-carboxylic acids, to the method of producing the same and to compositions comprising the same.

More particularly, the invention pertains to a thermosetting resin produced by the interaction of furfural in an acid medium with saturated hydroxy-carboxylic acids such as lactic, tartaric and the like and similar acids of the naphthenic type which may be produced by the oxidation of natural petroleum distillates of the general nature of kerosene and low boiling gas oils.

The broad object of our invention is to provide a new class of synthetic resins of desirable characteristics for use in moldable plastic combinations and in liquid coating compositions.

A more specific object of the invention is to provide new thermosetting resin compositions of extreme durability, low reactivity and low solubility in most ordinary solvents.

Another object of this invention is to provide a synthetic thermosetting resin derived from the interaction of furfural with saturated hydroxy-carboxylic acids generally.

Another object of the invention is to provide synthetic resins of desirable characteristics and a simple and economical method for their production from raw materials that are widely available in substantially unlimited quantity.

Other objects of our invention will be readily apparent from the description and discussion which follow.

Furfural, $C_4H_3O.CHO$, has long been known as a chemical compound and has now come to be recognized as a basic raw material being widely available at low cost from the dilute acid hydrolysis of hemi-celluloses, glucosides, etc., occurring in many vegetable materials. For use in the present invention the product of average commercial purity, or when redistilled, is entirely satisfactory.

Tartaric and lactic acids are also widely available in various degrees of purity as by-products of well established industries. Many other saturated hydroxy-carboxylic acids are known, particularly the oxy-naphthenic acids which may be produced in substantially unlimited quantity by the controlled oxidation of various petroleum distillates.

We have now discovered that when any of these saturated hydroxy-carboxylic acids are reacted with furfural at slightly elevated temperatures in the presence of an acidic catalyst resinous products are produced, as more fully hereinafter explained, which have particularly valuable properties for use in liquid coating compositions and in moldable thermosetting plastic combinations.

When a natural kerosene or solar oil distillate consisting largely of hydrocarbons having from about 10 to 15 carbon atoms per molecule is oxidized in substantially liquid phase with air or other oxygen containing gas at a temperature of about 300° to 350° F. and atmospheric or moderately elevated pressure, the oxidation reaction proceeds smoothly and the product of oxidation consists largely of carboxylic acids. These acids contain from two to five or more atoms of oxygen per molecule depending upon the extent to which the oxidation is carried. Ordinarily some acids containing only two oxygen atoms, as a carboxyl group, and corresponding closely to the well known naphthenic acids occurring naturally in petroleum are present along with acids of higher oxygen content in which from one to three or more oxygen atoms are present as hydroxyl groups in addition to the carboxyl group. In the description and discussion which follow and in the appended claims, the former will be referred to merely as naphthenic acids and the latter as oxy-naphthenic or hydroxy-carboxylic naphthenic acids.

Of these synthetic acids only the oxy-naphthenic acids react with furfural producing a resinous or resin-forming product. We have found that the best of the petroleum acids for use in the practice of our invention are the oxy-acids having from one to three hydroxyl groups, or mixtures in which such oxy-acids predominate. For instance, as more fully described in the co-pending application of one of us, Serial No. 214,342, filed June 17, 1938, a thermosetting resin of very good quality may be produced by reacting with furfural an oxy-naphthenic acid product corresponding approximately to the empirical formula $C_{14}H_{25}O_5$. Acids corresponding to the formulae $C_{12}H_{20}O_3$ and $C_{13}H_{23}O_3$ have also been used with good success. These formulae are based on combustion analyses and molecular weights by the cryoscopic method and hence, as will be readily appreciated by those skilled in the art, may not be taken as more than approximate. They are, however, adequately reliable for the illustrative purpose here intended.

Usually we prefer to employ oxy-naphthenic acids having at least one oxygen atom more than required by the carboxyl group and ten or more carbon atoms per molecule though acids of lower molecular weight, as for instance those containing but eight or nine carbon atoms, may be better suited to the production of resins having certain special combinations of characteristics. In other words, oxy-naphthenic acids having a molecular weight between about 160 and 260 and an oxygen content of from 20 to 35% by weight in which the oxygen is present largely in carboxyl and hydroxyl groups will be found suitable for the practice of this invention.

According to the present invention the saturated hydroxy-carboxylic acids are reacted with furfural in the presence of a mineral or strong organic acid catalyst at temperatures moderately above atmospheric, as for instance 200° to 220° F., in any appropriate form of apparatus, preferably one equipped with adequate stirring means and constructed of material which is not attacked by the reaction mixture. To the best of our present knowledge the fundamental resin-forming reaction involves equimolar quantities of furfural and oxy-acid though it may be that acids containing but one hydroxyl group and of low molecular weight such as lactic acid may react in higher proportions relative to the furfural. In general, however, about 5 parts by weight of hydroxy acid will be used with 2 parts by weight of furfural.

When the resin being produced is to be used in molding compositions and in other service wherein a product of maximum hardness and minimum solubility is required, it has been found desirable to adhere more closely to the exact reacting proportions of furfural and acid than when the resin is to be used in a coating composition or other service requiring substantial ductility. In the latter instance it will frequently be desirable to supply acid in slight excess of the reacting proportion in order that unreacted acid may remain in the product and serve as a plasticizer. An excess from 1 to about 15% of acid will be found suitable in this regard.

As the acidic condensation catalyst we have found that 5%, based on the weight of the reactants, of 18% aqueous hydrochloric acid is well suited to the reaction contemplated. Other proportions and concentrations may, however, be used with advantage, and other strong acids and acid reacting substances generally known to be effective in promoting organic condensation reactions may be employed if desired. For instance, sulfuric, phosphoric, hydrobromic, aryl-sulfonic, acetic and trichloracetic acids, aluminum chloride, stannic chloride and the like will be found more or less suitable.

In carrying out the reaction furfural, hydroxy-carboxylic acid and acidic catalyst in the desired proportions, as above indicated, are thoroughly mixed and heated in an appropriate container at 200° to 220° F., preferably with constant stirring to insure a homogeneous product. When the oxy-acid is a solid, as is the case with tartaric acid, it should be finely pulverized for efficient reaction. No evidence of reaction is apparent at first but after several minutes, usually between 15 and 60 depending upon the specific materials and the exact conditions employed, the reaction mass will be seen suddenly to gel if unstirred or to assume a crepe-rubber-like consistency if being stirred. This stage of the reaction is substantially complete in about one minute at the temperature given, and when complete the resin is entirely formed and is substantially infusible and insoluble in most organic solvents. Only a relatively small further decrease in solubility and fusibility is produced by even long periods of additional heating. If, however, the reaction is interrupted by quick cooling just after the reaction mixture has begun to show a rapid increase in viscosity, the resin product will not have reached the point of substantial infusibility and is hence particularly adapted to mixing with fillers, pigments and the like for the preparation of molded objects, the final infusible stage being attained in the mold or on subsequent heating as may be most convenient. While the exact point at which the reaction should be interrupted in order to secure best results in this regard will vary somewhat with the temperature of reaction, the proportion of reactants and particularly the catalyst employed, it can be determined by a few simple preliminary tests for any given set of conditions and can thereafter be reproduced without difficulty by means of careful timing.

The effectiveness of the acid catalyst can best be appreciated by reference to the following specific experiment: 2 parts of oxy-naphthenic acid produced by the controlled oxidation of a California kerosene distillate was mixed with 1 part of commercial furfural and the mixture refluxed on a steam bath for a period of three days, at the end of which time the mixture had become intensely black but was scarcely more viscous than at the beginning of the experiment. 5% of 18% hydrochloric acid was then added to the mixture and the refluxing resumed, whereupon in less than thirty minutes the resin-forming reaction was completed and the mass had become substantially solid.

While there are of course some differences in the resins resulting from the condensation of furfural with the several saturated hydroxy-carboxylic acids, the really surprising fact is that the products from acids as structurally different as are lactic acid and the polyhydroxy naphthenic acids should be as closely similar as we have found them to be. All of them are thermosetting, substantially insoluble in the ordinary solvents when set, extremely unreactive to most chemical reagents and may be prepared in a fusible state applicable to use in molding plastics by arresting the resin-forming reaction, as hereinabove described, during its violent stage. It may be worthy of note in passing that the furfural-tartaric acid resin is much harder than either the lactic or oxy-naphthenic acid products and when thermo-set is the least soluble in any solvent.

Since many organic reactions that are catalyzed by acids are also catalyzed by bases, the action of alkaline catalysts in the resin-forming reaction between hydroxy-carboxylic acids and furfural was investigated. It was found that under conditions comparable to those suitable for the reaction with an acid catalyst no reaction save polymerization of the furfural was effected by an alkaline catalyst.

The utility of our furfural saturated-hydroxy-carboxylic acid resins is illustrated by the following specific example: five parts by weight of saturated hydroxy acid was mixed with two parts of furfural and digested with aqueous hydrochloric acid for between eighteen and twenty minutes, at which time the mass acquired a soft rubbery consistency. The product was then mixed with wood flour, fiber and pigment in the ratio of 30 parts resin, 45 parts flour, 2 parts fiber and 23 parts pigment. The resulting plastic mush was molded at 5000 to 8000 pounds per square inch, heated for six to eight minutes at 250° to 300° F., cooled and removed from the mold. The molded article was hard, strong and clear-cut without being brittle and required no additional baking before use.

Having now described a new and useful class of synthetic resins derived from the reaction of saturated hydroxy-carboxylic acids generally with furfural and the conditions for their preparation and use, we claim as our invention:

1. A synthetic thermosetting resin composition consisting of a reaction product of furfural with a saturated organic oxy-carboxylic acid.

2. A composition comprising a thermosetting resin reaction product of furfural with a saturated organic hydroxy-carboxylic acid.

3. A composition comprising a thermosetting resin reaction product of furfural with tartaric acid.

4. A composition comprising a thermosetting resin reaction product of furfural with lactic acid.

5. A molded product comprising a thermosetting resin reaction product of furfural with a saturated organic hydroxy-carboxylic acid and a filler, said molded product being substantially infusible, substantially insoluble in all ordinary organic solvents, hard, strong and cohesive without being brittle.

6. A process of producing a molded product which comprises preparing a plastic composition from a furfural-saturated hydroxy-carboxylic acid resin and filler, compressing said plastic and heating to 250° to 300° F. for a period of several minutes.

7. The method of producing a synthetic resin which comprises reacting furfural with a saturated organic hydroxy-carboxylic acid at a temperature above atmospheric and in the presence of an acidic catalyst.

8. The method of producing a synthetic resin which comprises reacting furfural with a saturated organic hydroxy-carboxylic acid at a temperature of about 200° to 220° F. in the presence of about 5% by weight of 18% aqueous hydrochloric acid, the molecular proportions of hydroxy acid to furfural being at least 1:1.

9. The method of producing a synthetic resin which comprises reacting furfural with tartaric acid at a temperature of about 200° to 220° F. in the presence of about 5% by weight of 18% aqueous hydrochloric acid, the molecular proportions of tartaric acid to furfural being at least 1:1.

10. The method of producing a synthetic resin which comprises reacting furfural with lactic acid at a temperature of about 200° to 220° F. in the presence of about 5% by weight of 18% aqueous hydrochloric acid, the molecular proportions of lactic acid to furfural being at least 1:1.

IRVING E. LEVINE.
DONALD D. LEE.